United States Patent [19]

Sasaki et al.

[11] 4,208,303

[45] Jun. 17, 1980

[54] PROCESS FOR REGENERATING IRON-ANTIMONY OXIDE CONTAINING CATALYST

[75] Inventors: Yutaka Sasaki, Yokohama; Yoneichi Ikeda, Kamakura; Masaharu Tashiro, Yokohama; Toshio Nakamura, Yokosuka, all of Japan

[73] Assignee: Nitto Chemical Industry Co., Ltd., Tokyo, Japan

[21] Appl. No.: 954,675

[22] Filed: Oct. 25, 1978

[30] Foreign Application Priority Data

Oct. 26, 1977 [JP] Japan ................................. 52-127581

[51] Int. Cl.$^2$ ........................ B01J 23/94; B01J 27/30; C07C 120/02
[52] U.S. Cl. ................................. 252/417; 252/411 R; 252/416; 260/465.3
[58] Field of Search .................... 252/411 R, 416, 417

[56] References Cited

U.S. PATENT DOCUMENTS

| | | | |
|---|---|---|---|
| 3,668,147 | 6/1972 | Yoshino et al. ....................... | 252/439 |
| 3,716,496 | 2/1973 | Yoshino et al. .................... | 260/465.3 |
| 3,988,359 | 10/1976 | Saito ................................... | 260/465.3 |
| 4,052,333 | 10/1977 | Lee ..................................... | 260/465.3 |
| 4,083,804 | 4/1978 | Saito et al. ........................... | 252/439 |

FOREIGN PATENT DOCUMENTS 1365096 8/1974 United Kingdom ..................... 252/416

OTHER PUBLICATIONS

"Oxidation of Propylene by Means of $SnO_2 \cdot MoO_3$ Catalysts", J. Buiten, Journal of Catalysis, 10 (1968), pp. 188–199.

*Primary Examiner*—P. E. Konopka
*Attorney, Agent, or Firm*—Sughrue, Rothwell, Mion, Zinn and Macpeak

[57] ABSTRACT

A process for regenerating a deteriorated iron-antimony oxide containing catalyst comprising as essential components (i) iron, (ii) antimony, (iii) at least one element selected from the group consisting of vanadium, molybdenum and tungsten and (iv) tellurium, having the crystalline structure of an iron-antimony oxide compound, being substantially free of free antimony trioxide ($Sb_2O_3$) and containing at least 50 wt % of the original tellurium content of the fresh catalyst which comprises calcining said catalyst under a non-reducing atmosphere at a temperature of from about 600° to 950° C. and in the vicinity of or lower than the final calcining temperature used for producing the catalyst.

6 Claims, 3 Drawing Figures

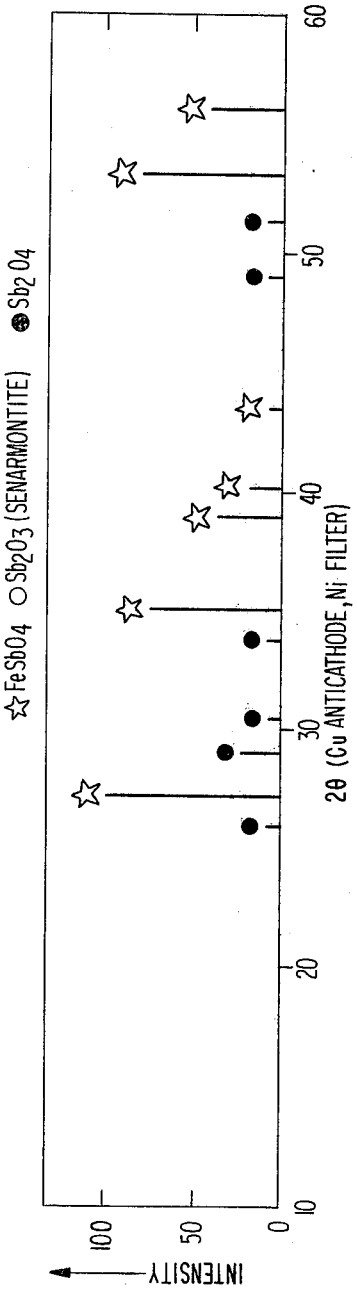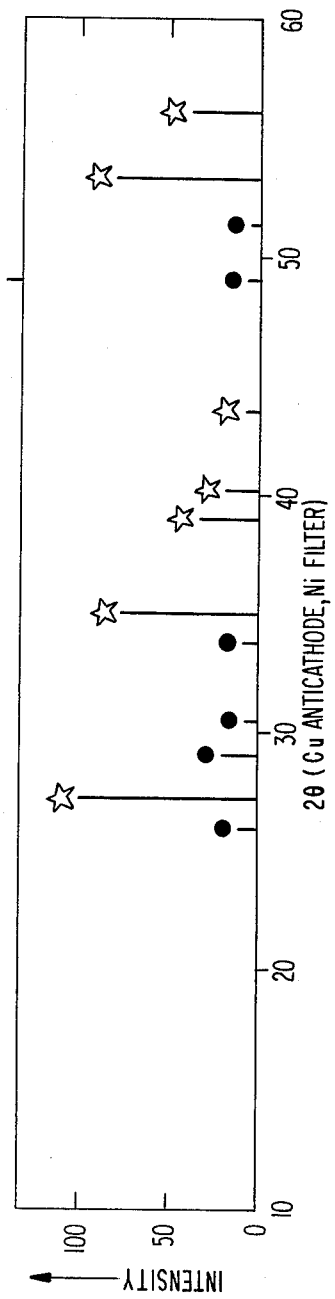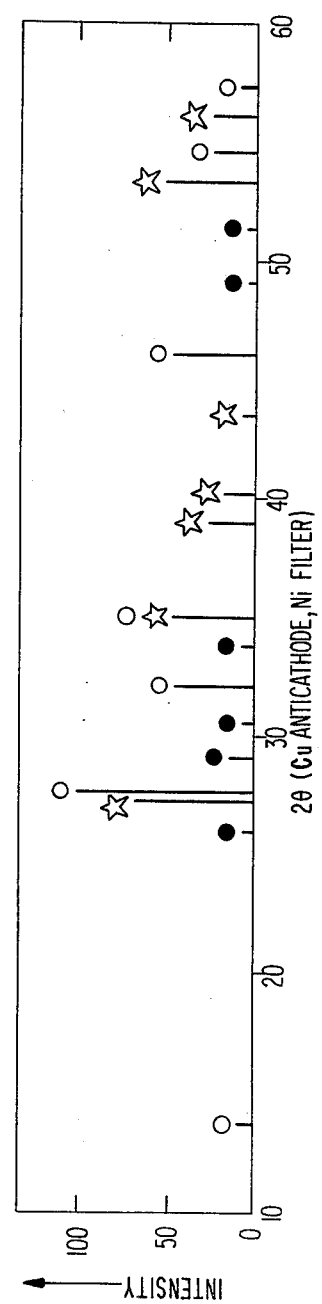

PROCESS FOR REGENERATING IRON-ANTIMONY OXIDE CONTAINING CATALYST

BACKGROUND OF THE INVENTION

1. Field of the Invention

This invention relates to a process for regenerating a deteriorated iron-antimony oxide containing catalyst having the crystalline structure of an iron antimony compound and being substantially free of antimony trioxide.

2. Description of the Prior Art

It is known that an iron-antimony oxide containing catalyst composition comprising as four essential components (i) iron, (ii) antimony, (iii) at least one element selected from the group consisting of vanadium, molybdenum and tungsten and (iv) tellurium is useful as a catalyst for the oxidation, ammoxidation or oxidative dehydrogenation of olefins. Such catalysts have been found useful in the oxidation of propylene to produce acrolein, in the ammoxidation of propylene to produce acrylonitrile, in the oxidation of isobutene to produce methacrolein, in the ammoxidation of isobutene to produce methacrylonitrile and in the oxidative dehydrogenation of butene-1 or butene-2 to produce butadiene. For further details of the catalyst, reference is hereby made to the following U.S. patents to the present inventors et al., U.S. Pat. No. 3,668,147, U.S. Pat. No. 3,716,496, U.S. Pat. No. 3,988,359 and U.S. Pat. No. 4,083,804 incorporated herein by reference.

The present invention is directed primarily to regenerating iron-antimony oxide containing catalysts which have been deteriorated as a result of their use in the oxidation, ammoxidation or the oxidative dehydrogenation of olefins, however, it will be readily apparent to the skilled artisan that the present invention is equally applicable to catalysts deteriorated in other types of reaction.

These catalysts exhibit good catalytic performance both in terms of their activity and their continued activity (the useful life of the catalyst), but gradually a decrease in the activity of the catalyst is inevitable. Improper reaction conditions may accelerate the loss in catalytic activity.

It is economically undesirable to continue to use the catalyst once its activity has been reduced to below a critical level. The adverse effects of the reduced activity are multiplied in a larger scale production, for instance, a large scale production of acrylonitrile, and considerable economic loss will result unless the catalyst is replaced. However, the catalyst is expensive and it is expensive for the manufacturer to replace the deteriorated catalyst with a fresh one. It would therefore be a great economical advantage if a feasible method of regenerating the catalyst could be found.

As will be understood from the above explanation, one criterion for determining whether a catalyst is deteriorated or whether the deteriorated catalyst has been regenerated by a regenerative method on an economic, as opposed to a technical level, takes into account the activity and selectivity of the catalyst. Accordingly, based on experience, a catalyst is termed "deteriorated" if the yield is reduced by more than 2 to 3% of the yield when the catalyst was fresh, and a catalyst is termed "regenerated" if such yield is restored to the fresh yield or a higher level.

It is extremely difficult to enumerate the causes of the loss of activity experienced during use of the catalyst. In most cases, many factors combine to cause such deterioration. What is more, locating a particular contributing factor does not necessarily lead to the development of an effective method for regenerating the catalyst. Therefore, many attempts at providing an effective means of regenerating the catalyst have turned unsuccessful.

Various studies have been made on the method of regenerating a catalyst used for synthesis of unsaturated nitriles, unsaturated aldehydes and diolefins, but these studies do not appear to have been successful. A rare exception is a method of regenerating an antimony-uranium oxide catalyst described in Japanese Patent Application (OPI) No. 8615/72 (The term "OPI" as used herein refers to a "published unexamined Japanese patent application".) corresponding in part to British Pat. No. 1,365,096. That method is characterized by heating an antimony-uranium oxide catalyst complex in a fluidized state, in a non-reducing gas at a temperature of from 800° to 1800° F. and for a time such that the surface area of the catalyst does not fall below a minimum critical level of 5 square meters per gram. The basic concept behind the method is to heat the catalyst before its performance, which is determined by the surface area of the catalyst, drops to a minimum critical level. In addition, the method is applicable over a very wide range of temperatures. Therefore, it may well be considered a satisfactory and practical method. It even allows for regeneration in the reactor, as illustrated by some of the examples set forth in the specification. However, iron-antimony oxide containing catalysts cannot be regenerated by such simple method. As described hereinafter, only those iron-antimony oxide containing catalysts which have specific compositions can be regenerated under relatively limited conditions. Therefore, unless proper care is used during the regeneration of this type of catalyst, not only does the regeneration fail but the performance of the catalyst may be impaired and result in irreparable damage.

A novel process has previously been proposed in U.S. Pat. No. 4,049,575 for the production of catalysts that include the catalyst which is to be regenerated by the process of this invention. The process is an extremely effective production method and can also be used to regenerate the deteriorated catalyst, as demonstrated by some of the working examples. However, the regeneration procedure taught in this patent is rather complex and costly because it comprises the steps of (1) preparation of the solution of catalytic components for impregnation, (2) impregnation of the deteriorated catalyst and (3) drying and calcining the impregnated catalyst. If the method is applied to the regeneration of the catalyst, new or already contained catalytic components can be excessively added, thus producing a regenerated catalyst of a different composition than the original. The method also relies upon a new catalytic component, thus producing a regenerated catalyst of a different composition than the original. What is more, changes in the reaction rate and optimum reaction conditions easily occur. For this reason, the regenerative method has not been found entirely satisfactory. On the contrary, in the regeneration of the present invention, a remarkable change of the reaction rate and a great variation of the suitable reaction condition are not caused. Also, it is possible to mix the catalyst regenerated in accordance with the present invention with a fresh catalyst. Therefore, the regeneration method of the present invention is commercially desirable.

SUMMARY OF THE INVENTION

As a result of various studies which have been made in search of a simpler method of regenerating deteriorated iron-antimony oxide containing catalysts, it has been found that the reduced activity of the iron-antimony oxide containing catalyst that presumably results from reductive deterioration cannot be restored simply by oxidizing the deteriorated catalyst. Furthermore, it has been found that a deteriorated iron-antimony oxide containing catalyst can be regenerated to a satisfactory level by calcining under specific conditions if it contains an iron-antimony oxide compound defined below, is substantially free of free antimony trioxide ($Sb_2O_3$) and its tellurium content has not been reduced below 50 wt % of its original tellurium concentration. The present invention is based on these findings.

It is therefore one object of the present invention to provide a method for regenerating an iron-antimony oxide containing catalyst which has had its activity deteriorated during use and more specifically during the oxidation, ammoxidation or oxidative dehydrogenation of olefins.

This invention is a method for regenerating a deteriorated iron-antimony oxide containing catalyst comprising as essential components (i) iron, (ii) antimony, (iii) at least one element selected from the group consisting of vanadium, molybdenum and tungsten and (iv) tellurium, wherein the iron-antimony oxide containing catalyst has the crystalline structure of an iron-antimony oxide compound defined below, is substantially free of free antimony trioxide ($Sb_2O_3$) and contains at least 50% by weight of its original tellurium content wherein the catalyst is calcined at a temperature of from about 600° to 950° C. but in the vicinity of or lower than the final calcining temperature used for producing the catalyst and under a non-reducing atmosphere.

BRIEF DESCRIPTION OF THE DRAWINGS

FIG. 1 is an X-ray diffraction pattern of Catalyst 1.
FIG. 2 is an X-ray diffraction pattern of the deteriorated catalyst produced in Example 1.
FIG. 3 is an X-ray diffraction pattern of the deteriorated catalyst produced in Comparative Example 1.

DETAILED DESCRIPTION OF THE INVENTION

The iron-antimony oxide containing catalyst which is to be treated by the process of this invention comprises as essential components iron, antimony, one element selected from the group consisting of vanadium, molybdenum and tungsten; and tellurium; if desired, it may optionally contain one or more elements selected from the group consisting of copper, magnesium, zinc, lanthanum, cerium, aluminum, chromium, manganese, cobalt, nickel, bismuth, tin, phosphorus and boron. The primary crystalline structure of a fresh catalyst of this type is that of an iron-antimony oxide compound as defined hereinbelow. The effective components of the catalyst have the following atomic ratio:

$$Fe_{10}Sb_aMe_bTe_cQ_dO_e$$

wherein Me is at least one element selected from the group consisting of V, Mo and W; Q is at least one element selected from the group consisting of Cu, Mg, Zn, La, Ce, Al, Cr, Mn, Co, Ni, Bi, Sn, P and B; a is 5 to 60; b is 0.01 to 10, c is 0.1 to 10, d is 0 to 20, and e is the number of oxygen atoms that combine with the above effective components to form an oxide.

Whether the iron-antimony oxide acts effectively as a catalyst for ammoxidation of propylene and also as a catalyst for the oxidation and oxidative dehydrogenation of olefins is not only determined by the composition of olefins and the composition of the iron-antimony oxide but also in order for the iron-antimony oxide to be an effective catalyst, a specific iron-antimony oxide compound must be present therein.

The latter is confirmed using an X-ray diffraction pattern. The d-values and relative intensities of this iron-antimony oxide compound are as tabulated below.

| 2Θ | d | I/Io × 100 |
|---|---|---|
| 2702 | 3.28 | 97 |
| 34.9 | 2.57 | 100 |
| 38.7 | 2.33 | 20 |
| 40.2 | 2.24 | 10 |
| 43.6 | 2.07 | 2 |
| 53.2 | 1.72 | 70 |
| 55.9 | 1.64 | 20 |
| 60.2 | 1.54 | 10 |
| 63.3 | 1.47 | 10 |
| 67.4 | 1.39 | 25 |
| 73.8 | 1.28 | 10 |

Θ :angle of diffraction (Ni filtered Cu Kα radiation)
d :lattice spacing
I :intensity of diffraction line
Io :intensity of the most intense diffraction line Basically, the crystalline structure of this iron-antimony oxide compound cannot clearly be defined as being the crystalline structure of $FeSbO_4$, but for purposes of this disclosure the term "having the crystalline structure of an iron-antimony oxide compound" means the catalyst has the crystalline structure defined by the above X-ray diffraction pattern. That is, the iron-antimony oxide containing catalyst is a catalyst containing the crystalline structure of an iron-antimony oxide compound, as the essential component, as confirmed by the above X-ray diffraction pattern.

This invention provides a process for regenerating such an iron-antimony oxide containing catalyst which has had its activity deteriorated by use in the reactions discussed hereinabove, by reduction in the course of the reactions, or under similar circumstances, but this invention is not capable of regenerating every deteriorated iron-antimony oxide containing catalyst. The deteriorated iron-antimony oxide containing catalyst which can be regenerated by the method of this invention must retain the basic crystalline structure of the iron-antimony oxide compound, must be substantially free of free antimony trioxide ($Sb_2O_3$) and must retain at least 50 wt percent of its original tellurium content. It is impossible to regenerate a deteriorated catalyst in which the iron-antimony oxide compound crystal structure has been broken by excessive reduction or which has antimony trioxide ($Sb_2O_3$) formed by reduction. A catalyst which can be regenerated by the process of this invention can be easily distinguished from a catalyst which cannot by X-ray diffraction.

The tellurium content of the iron-antimony oxide containing catalyst that can be treated in accordance with the present invention may be reduced by reduction. The extent to which it is reduced as well as the rate with which it may be reduced vary with the reaction and operating conditions. For instance, if the catalyst is used under considerably severe conditions or if the catalyst is reduced by improper operating conditions, the tellurium content in the catalyst will be decreased by a relatively large degree. The performance of the catalyst is not necessarily proportional to the tellurium content, but in the above instances a reduction in catalytic activity may result. The process of this invention is suitable for regenerating a catalyst in which the tellurium content has decreased to a relatively low level. The exact reason for this is not yet established but one possible explanation is that the tellurium component in the deteriorated catalyst may migrate within the catalyst during regeneration. But even the method of this invention is not capable of regenerating a deteriorated catalyst to the performance level of a fresh catalyst if an extreme amount of tellurium is lost from the catalyst, though such extreme losses will not occur frequently. In general, a deteriorated catalyst can be regenerated if its tellurium content is more than 50 wt % of that in a fresh catalyst. The deteriorated catalyst cannot be adequately regenerated if for some reason (reduction, excessive calcining, etc.), the tellurium content of the catalyst has decreased to an amount less than 50 wt % of that of the fresh catalyst. Only the specific deteriorated catalyst defined above may be regenerated by calcining in the method of this invention.

In accordance with this invention to regenerate the catalyst calcining must be carried out at a temperature ranging from 600° to 950° C., preferably 680° to 850° C. and in the vicinity of or lower than the final calcining temperature used to produce the catalyst and under a non-reducing atmosphere.

Since no ordinary method is capable of detecting the change which occur in a deteriorated catalyst, it is difficult to specify the exact nature of such a change, but presumably a structural change has occurred at the active sites on the surface of the catalyst. No deteriorated catalyst can be regenerated at a temperature lower than 600° C.; if it is exposed to such a temperature, oxidizing activity sometimes increases contrary to the intended object of the invention. This shows that the reaction involved in restoring the structure of the deteriorated catalyst according to this invention requires large activation energy and depends on temperature to a large extent.

If a temperature of 950° C. is exceeded, the performance of the catalyst will be aggravated, not simply because sintering deprives the catalyst of its active sites and thus reduces its reaction rate, but also because it considerably decreases its selectivity, variation in reaction rate and reduced strength of the catalyst result simultaneously.

The catalyst which can be regenerated by the method of the invention is a product of calcining under optimum conditions that vary with the catalyst's composition and manufacturing process. See U.S. Pat. No. 4,083,804. The temperature conditions and the time for regeneration should be milder than those employed in the production of the catalyst. To be more specific, the temperature for regeneration is preferably in the vicinity of or lower than the calcining temperature used in manufacturing the catalyst. Generally the manufacturing temperatures range from 500° to 1000° C. and more specifically from 600° to 950° C., again depending upon the composition and the manufacturing process. If the calcining temperature for regeneration is set at a higher level than that for manufacturing the catalyst, a shorter calcining time must be used. The relationship between temperature and time varies with the catalyst to some extent and defies a strict mathematical expression or relationship. The preferred temperature for regeneration is selected from the range of from a temperature of 150° C. less to 20° C. more than the final calcining temperature used in manufacture of the catalyst. However, as previously mentioned, temperatures less than 600° C. and those more than 950° C. are excluded. The preferred calcining time is from about 10 minutes to 10 hours.

A non-reducing atmosphere must be used in the method of this invention. A reducing atmosphere is out of the question because it results only in accelerated deterioration of the catalyst. An oxidating atmosphere is not essential. Air flow can conveniently be used for practical purposes, but nitrogen, helium, carbon dioxide gas, etc. may also be used.

The fact that the catalytic performance can be restored at the above temperature in an atmosphere of an inert gas seems inconsistent with the presumption that a chemical reduction is the cause of the catalyst deterioration. It might be more reasonable to regard the reaction involved in regenerating the catalyst as regenerating the surface properties of the catalyst rather than re-oxidation of the catalyst. But the possibility that oxygen adsorbed on the deteriorated catalyst contributes to restoration of the catalytic activity should not be overlooked. On the other hand if regeneration of the catalyst in accordance with the present invention involved only removal of organic matter from the surface of the catalyst, the process of this invention would not require such specified conditions as defined herein.

Water vapor cannot be used as the non-reducing gas. A small amount of water vapor may be present in the non-reducing gases set forth above, but using an increased amount of water vapor does not assure adequate restoration of catalytic activity because water vapor can cause the catalyst to sinter at an extremely accelerated rate, especially at higher temperatures.

There is no particular limitation on the type of the apparatus for calcining the deteriorated catalyst according to the method of this invention; a stationary furnace, a tunnel furnace, a rotary kiln, a fluidized bed calciner and other furnaces conventionally used for manufacturing catalysts can be used for the purposes of this invention. Care must be taken to provide substantial uniformity of temperature in the furnace. As one skilled in the art will appreciate apparent temperatures that seem to satisfy the conditions for the process of this invention are not necessarily adequate.

If the iron-antimony oxide containing catalyst to be treated by the process of this invention is a fluid catalyst, it is conveniently and preferably fluidized in a fluidized bed calciner that provides a uniform temperature distribution. As disclosed in Japanese Patent Publication No. 3756/75 an antimony containing solid catalyst suitable for use in fluidized bed reaction can be made by calcining catalyst particles at a high temperature (from about 400° to 1100° C.) in a fluidized bed calciner wherein the cross-sectional ratio of area in the upper portion to lower portion of the catalyst packed bed is from 1.2 to 3 and supplying as a fluidizing gas molecular oxygen or a gas that contains molecular oxygen at a linear velocity of 15 cm/sec or more in lower portion and 60 cm/sec or less in upper portion. Generally, the conditions for regeneration of the catalyst may be more broadly specified in comparison with those for the preparation of the catalyst, the regeneration is carried out easily. Therefore, the fluidized bed calciner as described above is not specified as to type and various types can be used. However, it is necessary to charge a fluidizing gas at a linear velocity above the incipient fluidization point. Such a method can be employed in regenerating the deteriorated catalyst according to the method of this invention. The process of this invention can be applied to a fluidized bed catalyst as well as to a fixed bed catalyst.

The catalyst thus regenerated by the process of this invention has its performance (yield, reaction rate and optimum reaction conditions) restored to a level substantailly equal to that of a fresh catalyst. In addition, the physical properties of the regenerated catalyst are little affected. Consequently, if the catalyst is a fluidized bed catalyst, its fluidizability suffers only a slight change that is not believed to have any adverse effect on the desired reaction when the catalyst is regenerated by this invention method. Accordingly, the regenerated catalyst can be used independently or in combination with a fresh catalyst.

The effect of the method of this invention should be checked by determining the actual restored activity of the catalyst by an activity test, but it can also be partially confirmed by measuring the specific surface area of the regenerated catalyst which is generally within the range ±30% of the specific surface area of a fresh catalyst. If this range is not obtained, either the deteriorated catalyst should not have been subjected to the method of this invention or the regenerating conditions used were improper.

The process of this invention can be repeated several times as long as the deteriorated catalyst is in the range defined herein.

As described hereinbefore, the process of this invention regenerates only a limited type of iron-antimony oxide containing catalyst under specific conditions, but it can satisfactorily be worked on an industrial scale, offering very advantageous economic effects.

The construction and effect of this invention will now be described in greater detail by reference to the following examples and comparative examples which by no means limit the scope of this invention.

CATALYST PREPARATION

EXAMPLE

Catalyst 1

A fluid catalyst having the empirical formula: $W_{0.25}Te_{1.0}Fe_{10}Sb_{25}O_{67.8}(SiO_2)_{30}$ was prepared in the following manner.

1.95 kg of metallic antimony powder of a particle size less than 100μ was gradually added to 7.2 liters of nitric acid having a specific gravity of 1.38 heated to about 80° C. After confirming complete oxidation of antimony, the excess nitric acid was removed. The antimony nitrate obtained was washed five times with 2 liters of water and transferred to a ball mill where it was ground for 3 hours to obtain Reagent I.

0.358 kg of electrolytic iron powder was gradually added to a solution of 3 liters of nitric acid (specific gravity: 1.38) in 4 liters of water heated to about 80° C. and stirred with the iron powder to obtain Reagent II.

41.8 g of ammonium para-tungstate was dissolved in 1.5 liters of water to provide Reagent III.

147 g of telluric acid was dissolved in 1 liter of water to provide Reagent IV.

3.84 kg of silica sol containing 30 wt % of $SiO_2$ was weighed out as Reagent V.

Reagents (I), (II), (III), (IV) and (V) were mixed and the pH was adjusted to 2.0 by gradually adding 15 wt % aqueous ammonia under stirring. The slurry thus obtained was heated at 100° C. for 4 hours under thorough stirring.

The slurry was then spray dried in a conventional manner. The fine spherical particles thus produced were dried first at 200° C. for 4 hours, then calcined at 400° C. for 4 hours, and finally at 830° C. for an additional 4 hours.

X-ray diffraction analysis confirmed that the crystalline structure of the resulting catalyst was mainly that of an iron-antimony oxide compound and was free of free $Sb_2O_3$ (see FIG. 1).

Catalyst 2

A catalyst having the empirical formula: $Cu_{0.5}Mo_{0.25}Te_{1.0}Fe_{10}Sb_{25}O_{68}(SiO_2)_{60}$ was prepared in the following manner.

2.91 kg of antimony trioxide powder (having a particle size of less than 20μ) was weighed out as Reagent I.

0.447 kg of electrolytic iron powder was gradually added to a heated solution of 3.2 liters of nitric acid (specific gravity: 1.38) in 2 liters of water to provide a solution of the powder, Reagent II.

3.53 g of ammonium para-molybdate, and then 184 g of telluric acid were dissolved in 500 ml of water to obtain Reagent III.

9.61 kg of silica sol (containing 30 wt % of $SiO_2$) was weighed out as Reagent IV.

97 g of copper nitrate was dissolved in 500 ml of water as Reagent V.

Reagents (I) to (V) above were mixed and the pH was adjusted to 2.0 by adding 15% aqueous ammonia under adequate stirring. The mixture was heated at 100° C. for 4 hours with adequate stirring.

The slurry thus obtained was spray dried in a conventional manner. The fine spherical particles thus produced were heated in a rotary kiln first at 250° C. for 2 hours, then at 400° C. for 2 hours and finally in a fluidized bed calciner at 810° C. for 4 hours.

Catalyst 3

A catalyst having the empirical formula: $W_{0.5}Te_{1.0}C_{3.0}Fe_{10}Sb_{25}O_{72}(SiO_2)_{60}$ was prepared in the same method used in preparing Catalyst 2, except that the raw materials for the catalyst component were: electrolytic iron powder: 0.446 kg, antimony trioxide powder: 2.91 kg, cobalt nitrate: 0.697 kg, ammonium paratungstate: 104.2 g, telluric acid: 183.3 g, silica sol (containing 30 wt % of $SiO_2$): 9.60 kg.

The final calcination was carried out in a fluidized bed calciner at 810° C. for 3 hours.

Catalyst 4

A catalyst having the empirical formula: $V_{0.1}Mo_{0.5}W_{0.3}Te_{2.3}Cu_3Fe_{10}Sb_{20}O_{65.25}(SiO_2)_{100}$ was prepared by repeating the procedure used in preparing Catalyst 2, except that the raw materials for the catalyst component were: electrolytic iron powder: 0.558 kg, antimony trioxide powder: 2.91 kg, copper nitrate: 0.885 kg, ammonium metavanadate: 11.7 g, ammonium paramolybdate: 88.1 g, ammonium paratungstate: 78.2 g, telluric acid: 527.2 g, silica sol (containing 30 wt % of $SiO_2$): 20.00 kg.

The final calcination was conducted in a fluidized bed calciner at 770° C. for 5 hours.

Catalyst 5

A catalyst having the empirical formula: $Mo_{0.3}W_{0.5}Te_{2.0}Mg_4Fe_{10}Sb_{25}O_{72.4}(SiO_2)_{50}$ was prepared by repeating the procedure used in preparing Catalyst 1, except that the raw materials for the catalyst component were: electrolytic iron powder: 0.358 kg, metallic antimony powder: 1.95 kg, magnesium nitrate: 0.657 kg, ammonium paramolybdate: 33.9 g, ammonium paratungstate: 83.6 g, telluric acid: 294.2 g, silica sol (containing 30 wt % of $SiO_2$): 6.42 kg.

The final calcination was conducted in a fluidized bed calciner at 760° C. for 5 hours.

The composition of Catalysts 3–5 are summarized in the Table below.

Table

| | Catalyst 3 | Catalyst 4 | Catalyst 5 |
|---|---|---|---|
| Fe | electrolytic iron 0.446 kg | electrolytic iron 0.558 kg | electrolytic iron 0.358 kg |
| Sb | antimony trioxide 2.91 kg | antimony trioxide 2.91 kg | metallic antimony 1.95 kg |
| Co | cobalt nitrate 0.697 kg | | |
| Cu | | copper nitrate 0.885 kg | |
| Mg | | | magnesium nitrate 0.657 kg |
| V | | ammonium metavanadate 11.7 g | |
| Mo | | ammonium paramolybdate 88.1 g | ammonium paramolybdate 33.9 g |
| W | ammonium paratungstate 104.2 g | ammonium paratungstate 78.2 g | ammonium paratungstate 83.6 g |
| Te | telluric acid 183.3 g | telluric acid 527.2 g | telluric acid 294.2 g |
| Si | silica sol ($SiO_2$ 30%) 9.60 kg | silica sol ($SiO_2$ 30%) 20.00 kg | silica sol ($SiO_2$ 30%) 6.42 kg |

X-ray diffraction analysis revealed that in spite of some differences in intensity, each of Catalysts 2 to 5 comprised iron antimony oxide compound as defined above as the main crystalline structure and no free $Sb_2O_3$ was found.

Using these catalysts, the following examples and comparative examples were conducted.

The following conditions were used in testing the activity of the catalysts.

ACTIVITY TESTING CONDITIONS

A fluidized bed reactor having an inner diameter of about 55 mm at the fluidized bed portion and which had baffles provided inside for improving contact efficiency was packed with each catalyst.

The reactor was fed with a gas of the following composition at an apparent linear velocity of 15 cm/sec. The reaction pressure was atmospheric.

$O_2$ (as air)/propylene=2.2 (molar ratio)
$NH_3$/propylene=1.15 (molar ratio)
Apparent contact time (ACT) is defined as follows:

$$ACT(sec) = \frac{\text{volume of catalyst bed*(liter)}}{\text{flow rate of gas as expressed in reaction conditions (l/sec)}}$$

*based on the apparent bulk density of the catalyst

EXAMPLE 1

Catalyst 1 was subjected to activity test under the conditions specified above.

When the molar ratio of oxygen to propylene was lowered in the course of the test, the concentration of oxygen in the dry gas at the outlet ($N_2+CO_2+CO+C_3H_6+O_2$) was found to be zero. With the oxygen concentration being 0, reaction was continued for about 30 minutes, and thereafter, the initial test conditions were restored.

The yield of acrylonitrile which was initially 80% was reduced to 76% as the catalytic activity of the catalyst deteriorated under the reducing conditions.

A sample of the catalyst extracted from the reactor was darker than it was before the test, but as shown in FIG. 2, X-ray diffraction analysis revealed that the crystalline structure of the catalyst was mainly that the iron-antimony oxide compound, with no free $Sb_2O_3$ detected.

The deteriorated catalyst was regenerated by calcining in a tunnel furnace in the presence of air at 820° C. for 4 hours.

EXAMPLE 2

Catalyst 2 was subjected to activity test under the conditions specified above.

Subsequently, the catalyst was subjected to a long-term test (about 750 hours) using the same reactor, except that the baffles were removed and gas was supplied at an apparent linear velocity of 5 cm/sec.

As the reaction continued, the selectivity of acrylonitrile gradually decreased and the concentration of oxygen in the dry gas at the outlet was 0.2 to 0.5%.

After the long-term test, Catalyst 2 was subjected to activity test under the conditions defined above. As Table 1 shows, the initial yield of acrylonitrile which was 77% decreased by 4% to 73%, but X-ray diffraction revealed that the major crystalline structure of the catalyst was that the iron-antimony oxide compound and that no free $Sb_2O_3$ was formed.

A fluidized bed calciner of the external heating type (upper portion diameter: 6 inches, lower portion diameter: 4 inches) was charged with the deteriorated catalyst, which was regenerated by calcining at 800° C. for 2 hours, with air supplied at a linear velocity of 15 cm/sec in lower portion.

EXAMPLE 3

A fluidized bed reactor (inner diameter: 8 inches) was packed with Catalyst 3, which was subjected to a long-term test under the following conditions for 1820 hours.

Air/propylene=10.0 (mol/mol)
$NH_3$/propylene=1.1 (mol/mol)
Reaction pressure=0.5 ($kg/cm^2G$)
Linear velocity of gas=18 (cm/sec)
Reaction temperature=460 (°C.)
ACT=8 (sec)

Activity tests on the fresh catalyst and the used catalyst under the conditions specified above showed that the yield of acrylonitrile obtained employing the used catalyst reduced by 2%. But X-ray diffraction showed that the major crystalline structure of the deteriorated catalyst was that of the iron-antimony oxide compound and that no free $Sb_2O_3$ was found.

Three samples each weighing 2 kg of the deteriorated catalyst were regenerated under the following conditions using the same fluidized bed calciner as employed in Example 2.
Condition (1): 790° C. for 6 hours
Condition (2): 800° C. for 4 hours
Condition (3): 810° C. for 1 hour

EXAMPLE 4

Catalyst 4 was subjected to activity test under the conditions specified above.

In the course of the activity test, the compressor failed and the rate of air being supplied dropped by about 70%. The normal reaction conditions were restored but the yield of acrylonitrile was found to have decreased by 3%. However, X-ray diffraction revealed that the main crystalline structure of the deteriorated catalyst was that of the iron-antimony oxide compound, with no free $Sb_2O_3$ being detected.

The deteriorated catalyst was charged into the same fluidized bed calciner as used in Example 2, and regenerated by calcining at 770° C. for 2 hours, with nitrogen gas being supplied at a linear velocity in lower portion of 15 cm/sec.

EXAMPLE 5

Catalyst 5 was subjected to activity test under the conditions defined above.

Subsequently, isobutylene was also introduced into the reaction system and the reaction was continued. Since gradual decrease in the yield of acrylonitrile was observed, supply of isobutylene was stopped to restore the initial reaction conditions. Although the yield of acrylonitrile had dropped by 2%. X-ray diffraction revealed that the principle crystalline structure of the deteriorated catalyst was that of the iron-antimony oxide compound with no free $Sb_2O_3$ found to have developed.

The deteriorated catalyst was extracted from the reactor and charged to the same fluidized bed calciner as used in Example 2 where it was regenerated by calcining at 750° C. for 4 hours with air being supplied at a superficial velocity in lower portion of 15 cm/sec.

The catalysts regenerated in Examples 1 to 5 were subjected to activity test under the conditions set forth above.

COMPARATIVE EXAMPLE 1

About 2 kg of Catalyst 1 was charged into a rotary kiln. As propylene was supplied, the temperature was gradually elevated to 450° C. which was maintained for 30 minutes.

The catalyst extracted from the reactor was black, with fine white crystals deposited on the surface. X-ray diffraction analysis showed the presence of free $Sb_2O_3$ (see FIG. 3).

The deteriorated catalyst was calcined in a tunnel furnace in the presence of air at 820° C. for 4 hours, as in Example 1. The activity of the original catalyst was not restored. Analysis of the regenerated catalyst by X-ray diffraction gave a different result than with a fresh catalyst.

COMPARATIVE EXAMPLE 2

Catalyst 2 was subjected to activity test on the conditions specified above, except that the reaction continued for about 50 hours with intermittent stoppage of air supply repeated several times.

Even if the normal reaction conditions were restored, the yield of acrylonitrile was only 32%, indicating that Catalyst 2 had deteriorated in activity considerably.

The deteriorated catalyst was charged into the same fluidized bed calciner as used in Example 2, and calcined under a flow of air at 800° C. for 2 hours. Satisfactory recovery of the activity could not be achieved. Analysis of the composition revealed that the tellurium content was reduced to 46% of that of the fresh catalyst.

COMPARATIVE EXAMPLE 3

The deteriorated catalyst produced in Example 3 was subjected to regenerating treatment under the same conditions as employed in Example 3, except that calcination was effected at 500° C. for 5 hours.

COMPARATIVE EXAMPLE 4

The deteriorated catalyst produced in Example 3 was subjected to regenerating treatment under the same conditions as employed in Example 3, except that calcination was effected at 1000° C. for 1 hour.

COMPARATIVE EXAMPLE 5

The deteriorated catalyst produced in Example 3 was calcined in a rotary kiln at 800° C. for 4 hours. The calcined catalyst appeared to have undergone excessive calcination and was whiter than the catalyst obtained in Example 3 under condition (2). Its specific surface area was only 67% of that of the fresh catalyst.

The catalysts regenerated in Comparative Examples 1 to 5 were subjected to activity test under the conditions specified above.

Table 1 below shows the results of the activity test on the catalysts regenerated in the Examples and Comparative Examples.

Table 1

| Example Comparative Example | Catalyst | Regenerating Conditions | | | | Result of Activity Test | | | |
|---|---|---|---|---|---|---|---|---|---|
| | | Atmosphere | Temperature (°C.) | Time (hr) | Type of furnace or calciner | Reaction temperature (°C.) | Contact time (sec) | Yield of acrylonitrile (%) | Propylene conversion (%) |
| Example 1. 1 | | | | | | 460 | 6 | 80 | 99 |
| 1 | (deteriorated) | | | | | " | " | 76 | 96 |
| 1 | (regenerated) | air | 820 | 4 | tunnel furnace | " | " | 81 | 99 |
| 2. 2 | | | | | | 460 | 6 | 77 | 99 |
| 2 | (deteriorated) | | | | | " | " | 73 | 95 |
| 2 | (regenerated) | air | 800 | 2 | fluidized calciner | " | " | 76 | 98 |
| 3. 3 | | | | | | | 5 | 78 | 98 |
| 3 | (deteriorated) | | | | | " | " | 76 | 95 |

Table 1-continued

| Example Comparative Example | Catalyst | Regenerating Conditions | | | | Result of Activity Test | | | |
|---|---|---|---|---|---|---|---|---|---|
| | | Atmosphere | Temperature (°C.) | Time (hr) | Type of furnace or calciner | Reaction temperature (°C.) | Contact time (sec) | Yield of acrylonitrile (%) | Propylene conversion (%) |
| 3 | -(1) (regenerated) | air | 790 | 6 | fluidized calciner | " | " | 78 | 99 |
| 3 | -(2) (regenerated) | " | 800 | 4 | fluidized calciner | " | " | 79 | 98 |
| 3 | -(3) (regenerated) | " | 810 | 1 | fluidized calciner | " | " | 78 | 98 |
| Example 4. 4 | | | | | | 440 | 5 | 82 | 98 |
| 4 | (deteriorated) | | | | | " | " | 79 | 95 |
| 4 | (regenerated) | N₂ | 770 | 2 | fluidized calciner | " | " | 82 | 99 |
| 5. 5 | | | | | | 450 | 4 | 83 | 99 |
| 5 | (deteriorated) | | | | | " | " | 81 | 98 |
| 5 | (regenerated) | air | 750 | 4 | fluidized calciner | " | " | 84 | 99 |
| Comparative 1 | (deteriorated) | | | | | 460 | 6 | high CO₂ yield extremely low acrylonitrile yield | |
| Example 1. 1 | (regenerated) | air | 820 | 4 | tunnel furnace | 460 | 6 | 71 | 89 |
| 2 | (deteriorated) | | | | | 460 | 6 | 32 | 82 |
| 2. 2 | (regenerated) | air | 800 | 2 | fluidized calciner | 460 | 6 | 72 | 97 |
| 3. 3 | (regenerated) | air | 500 | 5 | fluidized calciner | 460 | 5 | 75 | 97 |
| 4. 3 | (regenerated) | air | 1000 | 1 | fluidized calciner | 460 | 5 | 8 | 19 |
| 5. 3 | (regenerated) | air | 800 | 4 | rotary kiln | 460 | 5 | 76 | 92 |

While the invention has been described in detail and with reference to specific embodiments thereof, it will be apparent to one skilled in the art that various changes and modifications can be made therein without departing from the spirit and scope thereof.

What is claimed is:

1. A method for regenerating a deteriorated iron-antimony oxide containing catalyst comprising as essential components (i) iron, (ii) antimony, (iii) at least one element selected from the group consisting of vanadium, molybdenum and tungsten and (iv) tellurium, having the crystalline structure of an iron-antimony oxide compound, being substantially free of free antimony trioxide ($Sb_2O_3$) and containing at least 50 wt % of the original tellurium content of the fresh catalyst which comprises calcining said catalyst under a non-reducing atmosphere at a temperature of from about 600° to 950° C. and in the vicinity of or lower than the final calcining temperature used for producing the catalyst.

2. The method of claim 1 wherein the deteriorated catalyst is regenerated by calcining at a temperature in the range of from 600° to 900° C. and at a temperature 150° C. less to 20° C. more than the final calcining temperature used in producing the catalyst.

3. The method of claim 1 wherein the deteriorated catalyst is calcined in an atmosphere of air or nitrogen.

4. The method of claim 2 wherein the deteriorated catalyst is calcined in a fluidized bed calciner or tunnel furnace.

5. The method of claim 1 wherein said catalyst has the following empirical formula:

$$Fe_{10}Sb_aMe_bTe_cQ_dO_e$$

wherein Me is at least one element selected from the group consisting of V, Mo and W; Q is at least one element selected from the group consisting of Cu, Mg, Zn, La, Ce, Al, Cr, Mn, Co, Ni, Bi, Sn, P and B; the subscripts a, b, c, d and e represent the atomic ratio, a being 5 to 60, b being 0.01 to 10, c being 0.1 to 10, d being 0 to 20 and e being the number of oxygen atoms corresponding to oxide resulting from the combination of the above active ingredients.

6. The method of claim 1 wherein the deteriorated catalyst is calcined in a fluidized bed calciner wherein the cross-sectional area ratio of the upper portion to the lower portion of the catalyst packed column is from 1.2 to 3, with a flow of fluidizing gas being supplied at a linear velocity of 15 cm/sec or more in the lower portion of the column and 60 cm/sec or less in the upper portion of the column.

* * * * *